US006807460B2

(12) United States Patent
Black et al.

(10) Patent No.: US 6,807,460 B2
(45) Date of Patent: Oct. 19, 2004

(54) BEVERAGE QUALITY AND COMMUNICATIONS CONTROL FOR A BEVERAGE FORMING AND DISPENSING SYSTEM

(75) Inventors: William J. Black, Bethel, CT (US); Joseph Todd Piatnik, Jr., Bethel, CT (US); Timothy W. Bethuy, New Fairfield, CT (US); Richard V. Baxter, Jr., Appleton, WI (US); Jeffrey C. Thon, Appleton, WI (US); Edward G. Beistle, Appleton, WI (US); Andrew D. Nelson, Appleton, WI (US)

(73) Assignee: PepsiCo, Inc., Purchase, NY (US)

( * ) Notice: Subject to any disclaimer, the term of this patent is extended or adjusted under 35 U.S.C. 154(b) by 81 days.

(21) Appl. No.: 10/028,800

(22) Filed: Dec. 28, 2001

(65) Prior Publication Data

US 2003/0121937 A1 Jul. 3, 2003

(51) Int. Cl.[7] ................................................ G06F 17/00

(52) U.S. Cl. ....................... 700/244; 700/241; 700/239; 222/23; 222/52; 222/54; 222/71

(58) Field of Search ................................ 700/231, 232, 700/236, 249, 241, 239, 285; 222/129.1, 52, 54, 55, 23

(56) References Cited

U.S. PATENT DOCUMENTS 3,224,641 A 12/1965 Morgan
3,655,095 A 4/1972 Kienitz
3,823,571 A 7/1974 Smith et al.
3,853,244 A 12/1974 Neumann
4,440,314 A 4/1984 Vetter et al.
4,487,333 A 12/1984 Pounder et al.
4,632,275 A 12/1986 Parks
4,827,426 A 5/1989 Patton et al.
4,884,720 A 12/1989 Whigham et al.
4,903,862 A 2/1990 Shannon et al.
4,955,507 A 9/1990 Kirschner et al.
4,979,639 A 12/1990 Hoover et al.
5,011,043 A 4/1991 Whigham et al.
5,027,284 A * 6/1991 Senghaas et al. ........... 700/240
5,033,644 A 7/1991 Tentler
5,080,261 A 1/1992 Green
5,192,000 A 3/1993 Wandrick et al.
5,255,819 A 10/1993 Peckels
5,303,846 A 4/1994 Shannon
5,319,947 A 6/1994 Fischer
5,332,123 A 7/1994 Färber et al.
5,487,492 A 1/1996 Goulet
5,524,452 A 6/1996 Hassell et al.
5,673,820 A 10/1997 Green et al.
5,681,507 A * 10/1997 Kazuma ...................... 261/27
5,730,324 A * 3/1998 Shannon et al. .............. 222/61
5,868,279 A 2/1999 Powell
5,988,859 A * 11/1999 Kirk .......................... 700/232
6,312,589 B1 * 11/2001 Jarocki et al. ................. 210/8
6,364,159 B1 4/2002 Newman et al.
6,530,400 B2 * 3/2003 Nelson .......................... 141/2
6,536,626 B2 3/2003 Newman et al.
6,550,641 B2 4/2003 Newman et al.
6,550,642 B2 4/2003 Newman et al.

* cited by examiner

*Primary Examiner*—Khoi H. Tran
(74) *Attorney, Agent, or Firm*—Fitzpatrick, Cella, Harper & Scinto

(57) ABSTRACT

A beverage dispensing system includes a beverage dispenser which forms and dispenses a beverage and a processor for monitoring the beverage dispenser. The beverage dispenser operates under various parameters including a first parameter that is indicative of the quality of the beverage to be dispensed and a second parameter that is indicative as to when routine maintenance is to be scheduled. The processor monitors the various parameters under which the beverage dispenser operates and determines whether the first parameter is outside of a predetermined range. If the first parameter is outside the predetermined range, the processor sends a signal regarding a request for immediate repair service. The second parameter is also monitored and the routine maintenance is scheduled based thereon.

35 Claims, 4 Drawing Sheets

BEVERAGE QUALITY AND COMMUNICATIONS CONTROL FOR A BEVERAGE FORMING AND DISPENSING SYSTEM

BACKGROUND OF THE INVENTION

1. Field of the Invention

The present invention relates to beverage forming and dispensing systems. More particularly, the present invention relates to beverage forming and dispensing systems for effectively preparing a beverage mixture from concentrate, and even more particularly to beverage forming and dispensing systems for effectively monitoring and controlling the quality of a post-mix product and for communicating current product quality and operating data to a remote location.

2. Description of the Related Art

Beverages formed from concentrates are enjoyed around the world. An important advantage of forming a beverage from a concentrate is that only the concentrate need be shipped to the dispensing site; any available water supply at the site can be used to form the bulk of the final mixed product. A typical application of forming a beverage from a concentrate is a post-mix beverage dispensing system, commonly referred to as a fountain system, that mixes a syrup concentrate with carbonated water to form a beverage. Improving the quality of fountain beverages to meet the goal of a “bottle quality” carbonated beverage delivered by on-premise fountain equipment has been a long, ongoing process. Fountain equipment must consistently carbonate water to proper $CO_2$ volumes, cool product to the desired serving temperature and dispense water and syrup at a precise ratio to deliver the consumer’s drink with the desired quality. All this critical functionality must be delivered from a piece of equipment a fraction of the size and cost of the traditional bottle-plant equipment and with none of the rigorous plant maintenance procedures performed on a daily basis. Nevertheless, this quality goal has driven many design initiatives with varying degrees of success.

In the past, a new or novel mechanical, electromechanical or electronic control mechanism was designed to provide some improvement to basic functional elements of all or a portion of the carbonated fountain beverage process. There will be, no doubt, continued improvement and invention in the ongoing search for better fountain drink quality. Each of the past fountain proposals has always demonstrated some level of performance improvement in the element of beverage quality that was addressed. However, the actual level of improvement in the practical world was always less than expected due to the proposal’s design application to each successive generation of fountain equipment. One main limiting factor for continued, consistent drink quality performance improvements has been the increasing complexity of the machine design and the level of maintenance of each piece of fountain equipment once placed in daily operation. Typically, performance is initially improved when the machine is newly installed. Then, its performance deteriorates over time as the equipment’s required maintenance procedures are sporadically performed. Ultimately, the equipment condition deteriorates to a level with one of two probable outcomes. Either the unit provides a noticeably poor quality drink or the unit completely fails. Neither condition delivers the desired “bottle quality” beverage and both outcomes conclude by requiring an unplanned service action to restore normal operation.

There is a need, therefore, for an improved beverage dispensing system that monitors and controls the concentrate, water, and $CO_2$ supplies to improve beverage quality and that communicates a low quality or faulty operation to a remote location.

SUMMARY OF THE INVENTION

The present invention can provide a system for improving the quality of a dispensed beverage from a carbonated beverage forming and dispensing system.

The present invention can also provide a system for controlling the concentrate, water, and $CO_2$ supplies in a beverage forming and dispensing system to control the quality of a dispensed beverage.

The present invention can still further provide a system for communicating low quality or faulty operating conditions of a beverage forming and dispensing system to a remote location.

In one aspect of the present invention, a beverage dispensing system comprises a beverage dispenser for forming and dispensing a beverage and a processor. The beverage dispenser operates under various parameters including a first parameter that is indicative of the quality of the beverage to be dispensed and a second parameter that is indicative as to when routine maintenance is to be scheduled. The processor monitors the various parameters under which the beverage dispenser operates. The processor determines whether the first parameter is outside of a predetermined range and if the first parameter is outside the predetermined range, the processor sends a signal regarding a request for immediate repair service.

In another aspect of the present invention, a beverage dispensing method comprises the step of forming and dispensing a beverage with a beverage dispenser. The beverage dispenser operates under various parameters including a first parameter that is indicative of the quality of the beverage to be dispensed and a second parameter that is indicative as to when routine maintenance is to be scheduled. The method further includes the steps of monitoring the various parameters under which the beverage dispenser operates, determining whether the first parameter is outside of a predetermined range, and sending a signal regarding a request for immediate repair service if the first parameter is outside the predetermined range.

In a further aspect of the present invention, a beverage dispensing network comprises a plurality of beverage dispensers for forming and dispensing beverages, a processor and a central processing station. Each beverage dispenser operates under various parameters including a first parameter that is indicative of the quality of the beverage to be dispensed and a second parameter that is indicative as to when routine maintenance is to be scheduled. The processor monitors the various parameters under which at least one of the plurality of beverage dispensers operates. The processor determines whether the first parameter is outside of a predetermined range and if the first parameter is outside the predetermined range, the processor sends a signal regarding a request for immediate repair service. The central processing station communicates with the processor and receives the signal to effect the immediate repair service.

In yet another aspect of the present invention, a beverage dispensing apparatus comprises a carbonator, a water supply providing water to the carbonator, a temperature gauge, a $CO_2$ supply, a pressure gauge and a controller. The temperature gauge measures the temperature of the water supplied to the carbonator. The $CO_2$ supply provides $CO_2$ under a pressure to the carbonator and the pressure gauge measures the pressure of the $CO_2$ supplied to the carbonator. The controller communicates with the temperature gauge and the pressure gauge and controls the $CO_2$ supply. The carbonator mixes the water and the $CO_2$ to form carbonated water and the controller adjusts the pressure of the $CO_2$ supplied to the carbonator based on the measured $CO_2$ pressure and water temperature.

DETAILED DESCRIPTION OF THE PREFERRED EMBODIMENTS

The present invention provides a different approach to improve the level of beverage quality delivered by fountain equipment from that used in past proposals. As mentioned before, there will undoubtedly be continued improvements in fountain beverage quality delivered by further design refinements and future invention of new control concepts. Rather than trying to directly control the beverage quality with some new novel invention, one aspect of the present invention is directed to an equipment and beverage quality monitoring system. The system constantly monitors each piece of fountain equipment's operating quality and provides either feedback data to an equipment controller to adjust its operating parameters or communicates the need for service actions before beverage quality deteriorates to unacceptable levels that are noticeable by the consumer. It is a fountain beverage quality assurance system that provides feedback to imbedded control systems and communicates quality delivery performance to a service provider. The service provider can then plan appropriate service actions to restore beverage quality within acceptable limits.

The design of the present invention is completely flexible to work with today's equipment and technology while continuing to work with tomorrow's equipment designs with their unique technological solutions. The invention can define fountain beverage quality parameters for any piece of equipment and communicate present equipment performance within those defined quality parameters. In the fountain beverage industry, many generations of equipment will be present at any given time, all with their unique quality parameters and design technologies. The present invention allows all of those different units to co-exist and communicate at the same time to the same reporting system. In this way, the invention will allow all fountain equipment to provide the best possible beverage quality that the technology inherent in its design will allow. Or to put it another way, by maintaining equipment operations within its quality design parameters, the best possible beverage quality will be consistently delivered to the consumer.

Figure 1:
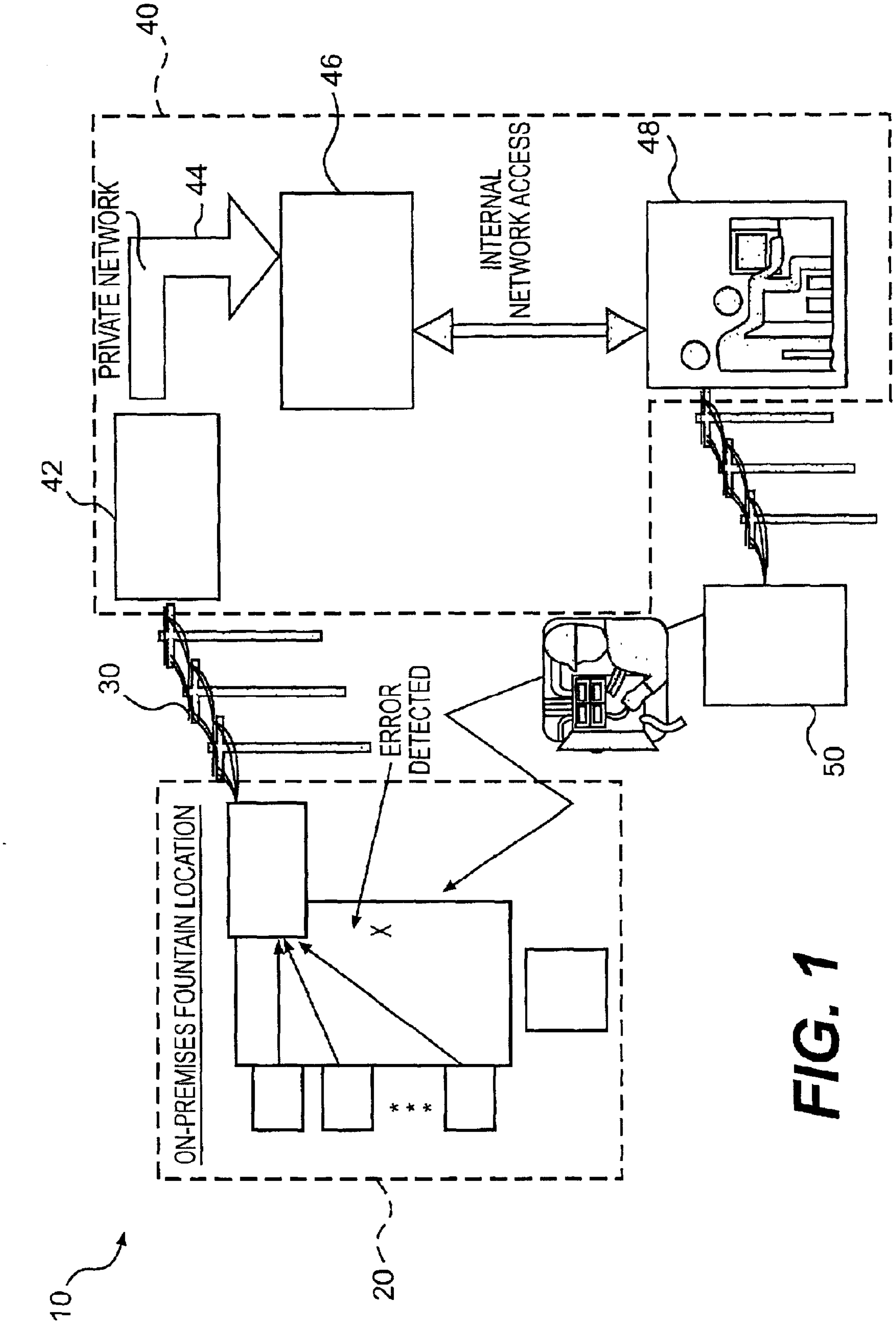
FIG. 1 is a schematic diagram of the control arrangement of the beverage dispensing system of the present invention.

FIG. 1 depicts a schematic diagram of the control arrangement of the beverage forming and dispensing system 10 according to the present invention. The system includes a local beverage dispenser or fountain 20. Dispenser 20 includes various beverage forming, monitoring and dispensing components, to be discussed later. Dispenser 20 communicates by way of communication lines 30 with a central service center 40. Communication lines 30 can be conventional telephone lines, for example. Service center 40 includes a local connection 42, a private network 44, a central database 46, and service center control section 48. Service center 40 communicates with a local service provider 50 by way of communication lines 30, which can be the same as or different from the communication lines between dispenser 20 and service center 40.

Service center control section 48 includes an unshown server including server software for receiving information from central database 46, processing various information, storing information in the database and transmitting information to local service provider 50. Generally, various operating parameters monitored by dispenser 20 are encoded and transmitted to central service center 40. The transmitted information is stored in central database 46 and forwarded to control section 48. The information is processed and the software program determines whether immediate repair is required at the particular dispenser 20 or whether and when routine maintenance is recommended. In making such determination, the maintenance history and stored parameters of the particular dispenser stored in database 46 can be accessed. If immediate or routine maintenance is necessary, service center control section 48 transmits an appropriate message to local service provider 50, which can dispatch an appropriate repairperson.

Any quality parameters that are deemed important to beverage quality for a particular dispenser can be monitored by the dispenser and transmitted to central service center 40. In addition to the flexible definition of the quality parameters, the communications design is fundamental to the effectiveness of the invention. It allows for data, i.e., parameters determined by each controller's unique application, to communicate across any technology means independent of the data format required for that communications means. In practical application, several units of the same design could communicate to the central service center using all means available by today's technology as well as any communications means developed in the future (e.g., wire telephony, wide-area cellular telephony, satellite communications, RF (radio frequency) carrier, microwave carrier, spread-spectrum power-line carrier, I-R (infrared) carrier, Ethernet LAN, USB LAN, Fire-Wire® LAN). There will be no need to redesign or reprogram the established equipment network every time a new communications technology is added to the system.

For each communications technology and for each controller application, a combination of hardware and software programming allows the data content to be preserved in the manner defined by a parameter definition file. This parameter definition file allows the fountain equipment designer to concentrate on developing effective quality measurement parameters, establishing their proper operational limits and not have to be concerned with the communications translations. Further freeing the designer, a communications mode is chosen for how effectively it meets the requirements of any given fountain equipment design application, not because it is required to carry the system's message data. For example, a fountain unit located in a typical convenience store may choose a wired telephony solution for its easily available connections, while a remote refreshment kiosk at a sport or park venue may choose a cellular solution due to limited access to a wired telephony provider.

The efficient design of the parameter definition file allows for variable lengths of parameter lists as well as variable lengths of the data for each parameter. This concept allows the embedded code to remain very small and compact, thus not requiring high-powered, computer processors to encode data. Code design not developed in this manner would place a potentially cost limiting effect on the utility of the system. As a result of this feature, small, simple devices by their very application result in simple parameter definition files, while the more complicated functionality of a larger device can be accommodated in a more robust parameter definition file. In either case, the parameter definition file scales up or down to match the performance needs and capabilities of the devices as required.

For example, the first digits of each parameter definition file would represent the machine ID and the remaining digits could represent any machine parameters. Once the first digits are read and the service center control section 48 identifies which machine has sent the parameter definition file, the remaining digits of the file can be interpreted. For a particular machine, the parameter definition file could include a series of binary digits beginning with the machine ID and then followed by a date/time stamp, water pressure, water temperature and an end of message stamp. A different machine could include a series of different binary data beginning with the machine ID, syrup temperature, water pressure, water temperature and end of message. The number of digits representing the water pressure in the first parameter definition file need not necessarily be the same as the number of digits representing the water temperature in the second parameter definition file.

Figure 2:
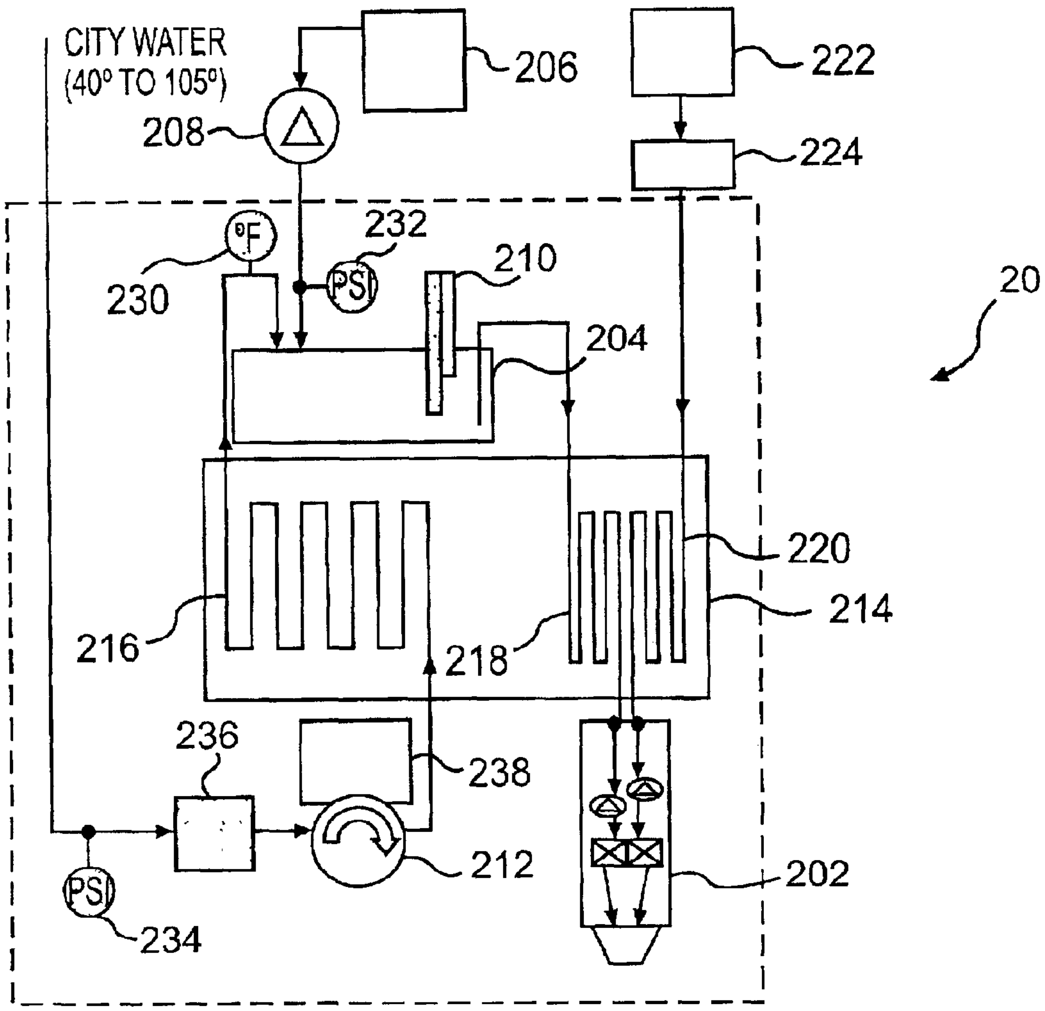
FIG. 2 is a schematic diagram of a first embodiment of a beverage dispenser usable with the system of the present invention.

The following description provides an example of how the present invention is applied to fountain beverage equipment or dispensers. A first embodiment of a dispenser, to which the present invention is applicable, is shown in FIG. 2 and includes one or more dispensing valves 202. Typical carbonation systems in this type of dispenser include a reserve holding tank 204 which is pressurized by $CO_2$ gas from $CO_2$ supply 206. The $CO_2$ gas is maintained at a constant pressure by a mechanical pressure regulator 208, for example. A reserve tank water level monitoring sensor 210 is used to control a pump and motor 212 to force water under pressure and within a design velocity range through an orifice to atomize the water as it enters tank 204. Within the tank the atomized water combines with the $CO_2$ gas to create carbonated water. The atomized carbonated water collects in the tank to maintain the water level between a set of minimum and maximum reserve quantity levels defined by sensor 210.

In order to prechill the water before it is supplied to tank 204, a cold plate 214 is provided. Cold plate 214 can comprise an aluminum block with internal passages 216, 218, 220 for fluids. The aluminum block typically sits at the bottom of an ice chest filled with ice to act as a heat sink. Water pumped by pump and motor 212 is forced through the passages 216 in cold plate 214 to chill it to the desired prechill temperature, for example, 33°–38° F., before it is supplied to tank 204. If desired, carbonated water dispensed from tank 204 can be sent through separate passages 218 in cold plate 214 before the carbonated water reaches mixing and dispensing valve 202.

Typically, the carbonated water is mixed with soft drink syrup at the dispensing valve 202. The syrup can be supplied from a reservoir 222 such as a "bag-in-box". The syrup is pumped by syrup pump 224 preferably through chilling passages 220 in cold plate 214 and to valve 202. When the valve is actuated, water in tank 204 and syrup from reservoir 222 are supplied through passages in the cold plate simultaneously and supplied to dispensing valve 202 where the components are mixed and dispensed.

One of the many critical elements to delivering a fountain beverage with "bottle quality" is the proper carbonation level of the drink, typically measured in $CO_2$ volumes. Proper carbonation of water within the fountain equipment is dependent upon many factors. First-order parameters are water temperature and $CO_2$ gas pressure. Present carbonation designs have other parameters such as water atomization and reserve capacity that can also influence the final $CO_2$ volumes delivered by the carbonation system. That is, the $CO_2$ gas absorption levels vary dependent upon the water temperature and $CO_2$ gas pressure, as well as atomization efficiency and total absorption time, which will vary corresponding to the quantity of water reserve maintained in the tank. A carbonation system that cannot control these basic parameters cannot deliver consistent carbonation quality ($CO_2$ volumes). Even the latest improvements in carbonation equipment today will fail to deliver improved carbonation quality if the cooling device used to stabilize the water temperature is not maintained and in good working order, if the $CO_2$ gas pressure is improperly maintained due to regulator performance or $CO_2$ gas supply status, or if the water pump performance has deteriorated over time to a level to be unable to deliver the required water velocity to properly atomize incoming water and properly maintain the tank reserve.

The application of the present invention to most current designs does not require upgrades to the controlling methods used to generate and maintain proper $CO_2$ volumes. However, key performance parameters for the system to deliver proper carbonation levels must be identified. Sensors to monitor these key parameters must be added to the control system as well as software performance modules. With these sensors and added software, the unit's local controller can monitor its own carbonation performance and report through a communication means (e.g., telephone) its present operational status and whether it has detected a parameter out of normal operating range, potentially requiring a service call to repair the problem. The present invention allows for remote service personnel dispatched from a central service monitoring station to review the data and decide what action, if any, needs to be taken. The detection and service communications will occur long before the consumer has noticed any deleterious effect on the carbonation levels of the beverage served.

Figure 3:
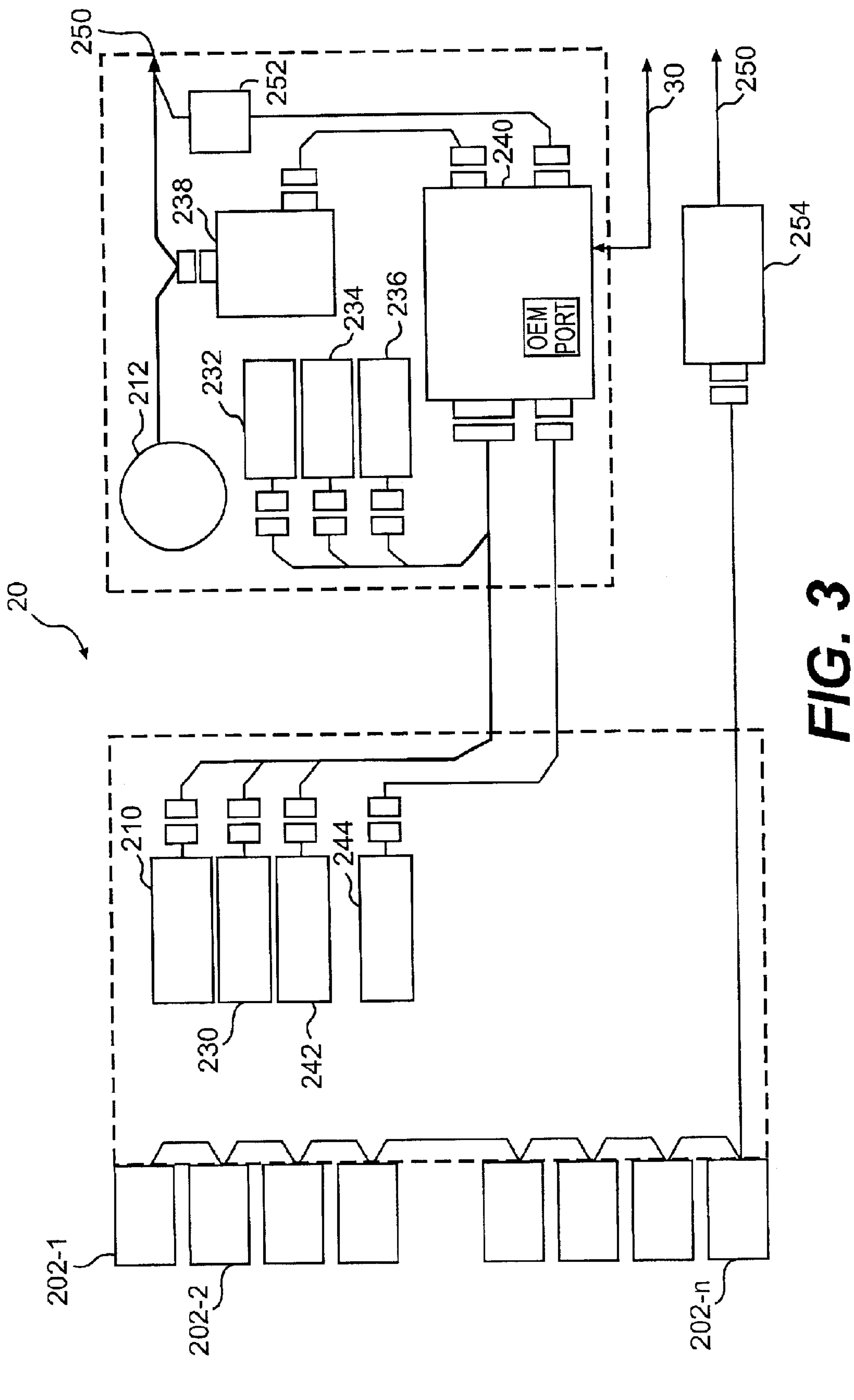
FIG. 3 is a schematic diagram of the control arrangement of the beverage dispenser of the first embodiment.

The foregoing upgrades incorporated into the fountain beverage equipment are shown in FIG. 2 and the control thereof is shown in FIG. 3. Both operational and maintenance parameters were defined. To monitor operational factors that directly affect carbonation quality, dispenser 20 is provided with a temperature sensor 230 downstream of cold plate 214 to continuously sample pre-chill output water temperature and a pressure sensor 232 is provided in the $CO_2$ supply line to continuously sample $CO_2$ gas pressure supplied to the carbonator tank 204. These parameters were continuously sampled to assure they remain within defined operating limits.

To monitor maintenance factors that affect carbonation quality, incoming water pressures, water pump flow rate and pump-motor actual usage are sampled and recorded to indicate when periodic maintenance is required to keep quality performance within quality limits. To this end, dispenser 20 is provided with a pressure sensor 234 and a flow sensor 236 in the water supply line upstream of pump 212, and is further provided with a module 238 connected to the power supply of pump and motor 212. It should be noted that this allows for the further advantage of maintenance intervals to be based on actual usage and conditions of the equipment and not artificially or arbitrarily set intervals. Combinations of these sensor inputs can also be used to detect potential operating problems before they cause beverage quality to be reduced below acceptable limits.

As shown in FIG. 3, the various sensors and module can communicate with a unit controller 240, which can be any available microprocessor. In addition, water level monitoring sensor 210 communicates with controller 240 to determine when the water reserve is within the desired levels and to correspondingly actuate pump and motor 212 via module 238. Controller 240 preferably includes a modem or some other communications device to communicate through communication lines 30. A key switch 242 and a unit ID data module 244 unique to each particular dispenser are provided in dispenser 20 and communicate with controller 240. Power supply to the dispensing unit can be any standard source. For example, any standard household electrical source 250 can power the system, with 120/240 V being supplied to pump motor 212 and 24 V being supplied to controller 240 and the dispensing section via transformers 252, 254.

The control system of each dispenser 20 provides for two classes of actions to be taken for the defined parameters. First, it monitors for specific parameter limits or equipment operating conditions that affect beverage quality and reports this information immediately to service center 40 as a "Sudden-Service" message. Second, it periodically samples and records selected data parameters to be reported to the service center at off-peak hours as "Operational & Event Data" or "OED" messages. The sampled data parameters are then scanned by service monitoring programs at service center 40 to schedule preventative maintenance service calls based on actual equipment usage. In this manner, the data scanning programs can be updated to match the most current service maintenance schedules.

A description of an example of communications for Sudden-Service message types will now be described. Using sensors 230, 232, 236, controller 240 respectively monitors absolute temperature, pressure, and flow rate for excursions beyond predefined acceptable limits. When these parameter limits are exceeded, the system always records the date, time and nature of the excursion. If the nature of the excursion requires immediate service attention to return the unit to acceptable quality limits, controller 240 takes the following actions:

1. constructs a "Sudden-Service" message with machine ID from module 244 and nature of the excursion identified based on the pre-defined message data format stored in its internal programming;
2. connects to the service center network server to transfer the Sudden-Service message; and
3. receives confirmation that the message was received by the service center server, then disconnects from the service center network.

On the receiving end of the service center 40, the message is automatically read by the network server software program after the whole message is received, acknowledged and the communication session has been terminated with the dispensing unit 20. The following actions are taken based on the service center software:

1. using the machine ID information, the program determines how to decode the data sent by the dispensing unit at the customer's site;
2. the message data is "translated" to a text message using the predefined process for the equipment that the service center's program has access to in the parameter definition file;
3. the machine ID information is also used to provide current customer address data to complete the Sudden-Service message generation process;
4. the finished Sudden-Service message is then sent to a service center call manager's attention at local service provider 50 via e-mail marked as urgent; and
5. the service center call manager processes and assigns the Sudden-Service message for follow-up per established service procedures.

A description of communications for Operational & Event Data (OED) message types will now be described. When controller 240 determines that an OED reporting interval occurs, such as by monitoring usage of module 238 of pump and motor 212, the controller takes the following actions:

1. constructs an OED message with Machine ID and the data formatted as defined in the parameter definition file;
2. connects to the service center network server at service center 40 to transfer the OED message; and
3. receives confirmation that the message was received by the network server, then disconnects from the service center network.

When an OED message is received by the service center network server the following steps are taken to process the incoming message:

1. using the Machine ID information, the program determines how to decode the data sent by the dispenser 20 at the customer's site;
2. the message data is "translated" to a database format using the predefined process for the equipment that the service center's program has access to in the parameter definition file;
3. the data is then added to the unit's database file for the specific dispenser unit identified by the Machine ID;
4. the service center server then processes the updated data file by executing predefined service maintenance scanning programs on the newly received data; and
5. any service action items identified by the scanning programs will generate additional messaging steps which use the Machine ID information to identify the customer location, specify the required service action and construct an e-mail notification that will be sent to the service center call manager at local service provider 50. The call manager will then process the service notification per established operating procedures.

Figure 4:
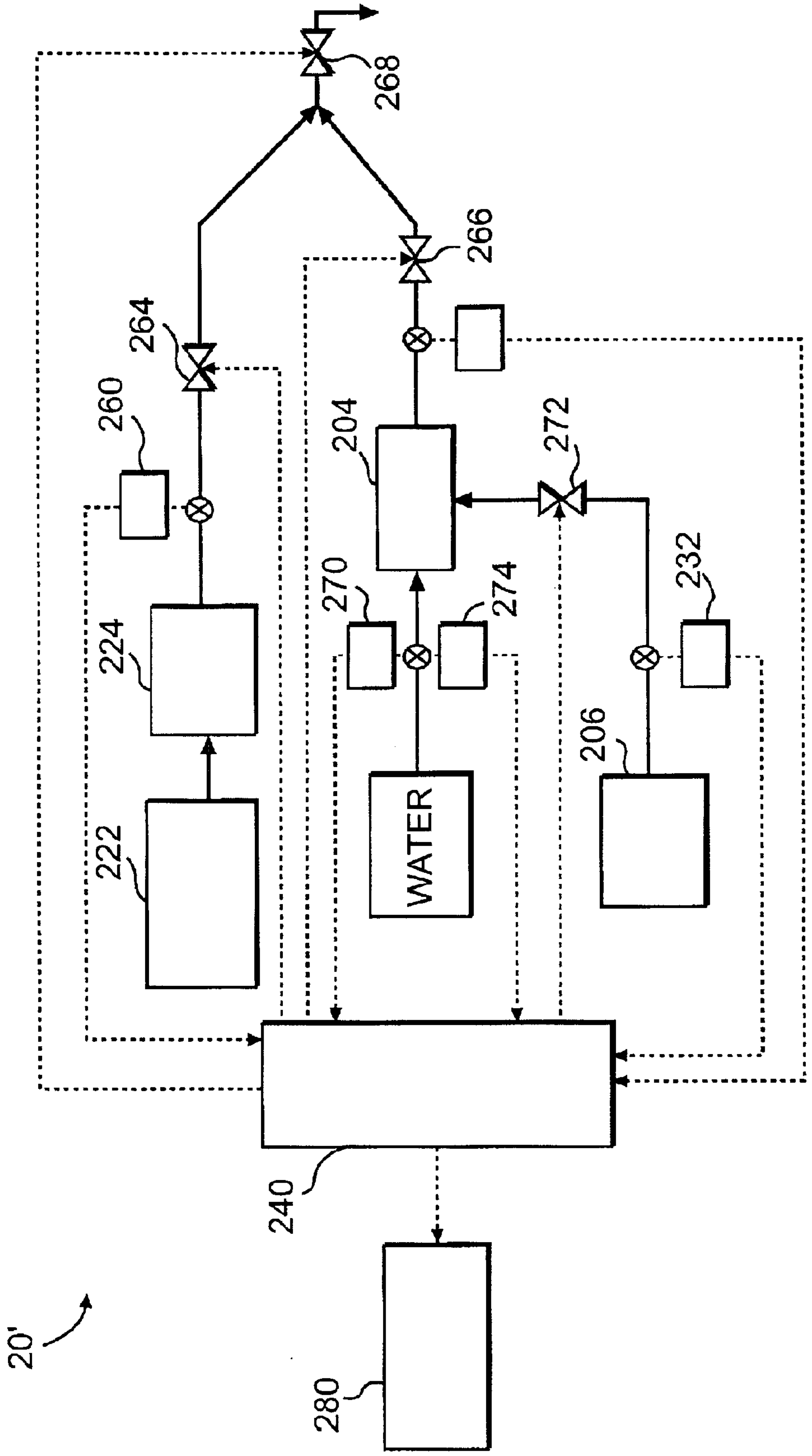
FIG. 4 is a schematic diagram of a second embodiment of a beverage dispenser usable with the system of the present invention.

In a second embodiment, another dispenser unit 20' usable with the beverage dispensing system of the present invention will be described with reference to FIG. 4. The dispenser of the second embodiment utilizes internal feedback to adjust the operating parameters when possible. Components in the second embodiment that are the same as or similar components in the first embodiment will be identified with the same reference numerals.

Controller 240, such as a processor or a circuit, controls the flow rate of syrup concentrate pumped from a concentrate supply 232 by concentrate pump 224 and controls the flow rate of water supplied from the water supply, for example, a domestic water supply. Controller 240 also controls a $CO_2$ supply 206 to carbonator tank 204.

A first flow sensor (FS) 260 measures the output of concentrate pump 224 on the warm side of the concentrate supply line. Measuring on the warm side negates the effects of viscosity on flow measurement. A second flow sensor 262 measures the flow rate of carbonated water supply from carbonator tank 204. Flow sensors 260 and 262, as well as other flow sensors in the system, are preferably turbine type flow sensors that utilize a hall effect arrangement to generate a pulsed signal proportional to the flow rate and that operate at approximately 12,500 pulses per gallon. Flow sensors 260 and 262 provide flow rate outputs to controller 240, which controls a first valve 264 to control the pumped concentrate and a second valve 266 to control the supplied carbonated water, thereby delivering the concentrate and carbonated water to a dispenser valve 268 at a predetermined ratio.

Valves 264 and 266 are preferably pulsing type solenoid valves. Fluid valves 264 and 266 preferably operate at about 80 psi, with a minimum flow rate of about 0.75 ounces/second. Dispenser valve 268 is preferably a "dumb" valve, which operates only in an on/off arrangement, i.e., it does not control fluid flow rate other than that resulting from solenoid seat size. The "dumb" valve provides an on/off means for fluid flow and a means to mix the beverage.

A temperature sensor 270, for example, a thermistor, measures the temperature of non-carbonated water supplied to carbonator tank 204, and pressure sensor 232, for example, a pressure transducer, measures the pressure of $CO_2$ supplied to carbonator tank 204 from $CO_2$ supply 206. Outputs from temperature sensor 270 and pressure sensor 232 are transmitted to controller 240, which controls a valve 272 in the $CO_2$ supply line to maintain the carbonator pressure at a predetermined level, thereby maintaining proper carbonation levels. Gas valve 272 is preferably a pulsing type solenoid valve operating at a midrange pressure of about 150 psi, with a leak rate of zero. Controller 240 preferably controls valve 272 by using a look up table to determine the optimum $CO_2$ pressure, based on the water temperature.

Preferably, controller 240 monitors the steady state water temperature detected by temperature sensor 270 and adjusts solenoid valve 272 to maintain a pressure in carbonator tank 204 at about 100 psi by increasing or decreasing the $CO_2$ pressure provided to carbonator tank 204.

Preferably, the temperature sensor 270 is accurate within the range of about 35° F. to about 100° F., with a midrange of about 75° F., and the pressure sensor 232 operates with a midrange of about 100 psi, with an accuracy of ±2%.

An additional flow sensor 274 in the non-carbonated water line communicates with controller 240 to signal an error when the flow of inlet water to carbonator tank 204 drops below a predetermined level.

The present invention is not limited to pulse type solenoid valves or turbine type flow sensors. Rather, any flow control valve that controls the flow of the water, concentrate, or $CO_2$ is acceptable, and any flow sensor that detects the flow rate of the concentrate or water is acceptable. Furthermore, temperature sensors other than a thermistor are sufficient to detect the temperature of the non-carbonated water, and any means for sensing the pressure of the $CO_2$ supply is sufficient.

To incorporate dispenser 20' into the beverage dispensing system shown in FIG. 1, a communications module 280, such as a processor or a circuit, is provided. Communications module 280 communicates with controller 240 and utilizes data from the controller to monitor and store operating data and quality data. The quality data can include the concentrate/carbonated water mixing ratio and the carbonation level. Communications module 280 also has means, such as a modem or a two-way paging system, for communicating the operating and quality data to central service center 40.

It is also preferable for a single communications module to accommodate multiple dispensers, allowing a plurality of fountain dispensers to connect to the communications module.

It is preferable to use the present invention with computer hardware that performs the controlling and communication functions. As will be appreciated by those skilled in the art, the systems, methods, and procedures described herein can be embodied in a programmable computer, computer executable software, or digital or analog circuitry. The software can be stored on computer readable media, for example, on a floppy disk, RAM, ROM, a hard disk, removable media, flash memory, memory sticks, optical media, magneto-optical media, CD-ROMs, etc. The digital circuitry can include integrated circuits, gate arrays, building block logic, field programmable gate arrays (FPGA), etc.

Although specific embodiments of the present invention have been described above in detail, it will be understood that this description is merely for purposes of illustration. Various modifications of, and equivalent steps corresponding to, the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

We claim:

1. A beverage dispensing system comprising:

a beverage dispenser for forming and dispensing a beverage, said beverage dispenser comprising a carbonator in which water is mixed with $CO_2$ gas to form carbonated water, said beverage dispenser operating under various parameters including a first parameter that is indicative of the quality of the beverage to be dispensed and a second parameter that is indicative as to when routine maintenance is to be scheduled; and a processor monitoring the various parameters under which said beverage dispenser operates, said processor determining whether the first parameter is outside of a predetermined range and if the first parameter is outside the predetermined range, said processor sends a signal regarding a request for immediate repair service, wherein said processor monitors at least one of the water temperature and the $CO_2$ gas pressure as the first parameter.

2. The beverage dispensing system according to claim 1, wherein said processor is integrated with said beverage dispenser.

3. The beverage dispensing system according to claim 1, wherein said processor constantly monitors the first parameter and periodically monitors the second parameter.

4. The beverage dispensing system according to claim 1, wherein said processor further monitors the water flow rate to the carbonator as the first parameter.

5. The beverage dispensing system according to claim 1, wherein in said carbonator, the water is pumped by a pump and mixed with the $CO_2$ gas to form the carbonated water and said processor monitors at least one of the water pressure, the pump flow rate and actual pump usage as the second parameter.

6. The beverage dispensing system according to claim 1, further comprising a central processing station remote from said beverage dispenser and communicating with said processor.

7. The beverage dispensing system according to claim 6, wherein said central processing station dispatches a repairperson to said beverage dispenser when said processor requests immediate repair service.

8. The beverage dispensing system according to claim 6, wherein said central processing station processes data regarding the second parameter sent from said processor in order to schedule the routine maintenance.

9. The beverage dispensing system according to claim 6, wherein said processor sends the signal regarding the request for immediate repair service to said central processing station immediately upon determining that the first parameter is outside of the predetermined range.

10. The beverage dispensing system according to claim 6, wherein said processor sends data relating to the second parameter to said central service center at periodic intervals.

11. The beverage dispensing system according to claim 1, wherein said processor is provided remote from said beverage dispenser.

12. The beverage dispensing system according to claim 1, wherein said processor is programmable and the first and second parameters to be monitored can be changed.

13. The beverage dispensing system according to claim 1, wherein said processor can control components of said beverage dispenser based on monitored parameters.

14. A beverage dispensing method comprising the steps of:

forming and dispensing a beverage with a beverage dispenser, the beverage dispenser comprising a carbonator in which water is mixed with $CO_2$ gas to form carbonated water, the beverage dispenser operating under various parameters including a first parameter that is indicative of the quality of the beverage to be dispensed and a second parameter that is indicative as to when routine maintenance is to be scheduled;

monitoring the various parameters under which the beverage dispenser operates;

determining whether the first parameter is outside of a predetermined range; and sending a signal regarding a request for immediate repair service if the first parameter is outside the predetermined range, wherein at least one of the water temperature and the $CO_2$ gas pressure is monitored in said monitoring step as the first parameter.

15. The beverage dispensing method according to claim 14, wherein in said monitoring step, the first parameter is constantly monitored and the second parameter is periodically monitored.

16. The beverage dispensing method according to claim 14, wherein in said monitoring step, the water flow rate to the carbonator is further monitored as the first parameter.

17. The beverage dispensing method according to claim 14, wherein in the carbonator, the water is pumped by a pump and mixed with the $CO_2$ gas to farm the carbonated water and in said monitoring step at least one of the water pressure, the pump flow rate and actual pump usage is monitored as the second parameter.

18. The beverage dispensing method according to claim 14, wherein a central processing station dispatches a repairperson to the beverage dispenser when immediate repair service is requested in said signal sending step.

19. The beverage dispensing method according to claim 14, wherein a central processing station processes data regarding the second parameter in order to schedule the routine maintenance.

20. The beverage dispensing method according to claim 14, wherein data relating to the second parameter is sent to a central service center at periodic intervals.

21. The beverage dispensing method according to claim 14, further comprising the step of controlling components of the beverage dispenser based on monitored parameters.

22. A beverage dispensing network comprising:

a plurality of beverage dispensers for forming and dispensing beverages, at least one of said beverage dispensers comprising a carbonator in which water is mixed with $CO_2$ gas to form carbonated water, each beverage dispenser operating under various parameters including a first parameter that is indicative of the quality of the beverage to be dispensed and a second parameter that is indicative as to when routine maintenance is to be scheduled;

a processor monitoring the various parameters under which the at least one of said plurality of beverage dispensers operates, said processor determining whether the first parameter is outside of a predetermined range and if the first parameter is outside the predetermined range, said processor sends a signal regarding a request for immediate repair service, wherein said processor monitors at least one of the water temperature and the $CO_2$ gas pressure as the first parameter; and a central processing station communicating with said processor and receiving the signal, said central station effecting the immediate repair service.

23. The beverage dispensing network according to claim 22, wherein said processor is integrated with at least one of said beverage dispensers.

24. The beverage dispensing network according to claim 22, wherein said processor constantly monitors the first parameter and periodically monitors the second parameter.

25. The beverage dispensing network according to claim 22, wherein said processor further monitors the water flow rate to the carbonator as the first parameter.

26. The beverage dispensing network according to claim 22, wherein in the carbonator, the water is pumped by a pump and is mixed with the $CO_2$ gas to form the carbonated water and said processor monitors at least one of the water pressure, the pump flow rate and actual pump usage as the second parameter.

27. The beverage dispensing network according to claim 22, wherein said central processing station dispatches a repairperson to said beverage dispenser when said processor requests immediate repair service.

28. The beverage dispensing network according to claim 22, wherein said central processing station processes data regarding the second parameter sent from said processor in order to schedule the routine maintenance.

29. The beverage dispensing network according to claim 22, wherein said processor sends the signal regarding the request for immediate repair service to said central processing station immediately upon determining that the first parameter is outside of the predetermined range.

30. The beverage dispensing network according to claim 22, wherein said processor sends data relating to the second parameter to said central service center at periodic intervals.

31. The beverage dispensing network system according to claim 22, wherein said processor is provided remote from said beverage dispensers.

32. The beverage dispensing network according to claim 22, wherein said processor is programmable and the first and second parameters to be monitored can be changed.

33. The beverage dispensing network according to claim 22, wherein said processor can control components of said beverage dispensers based on monitored parameters.

34. The beverage dispensing network according to claim 22, wherein information is transmitted from said processor to said central processing station in a parameter definition file, the parameter definition file being scalable to accommodate parameters of different sizes.

35. The beverage dispensing network according to claim 34, wherein each parameter definition file includes an ID identifying the dispenser from among said plurality of dispensers with which the accompanying parameters are associated.

* * * * *